UNITED STATES PATENT OFFICE.

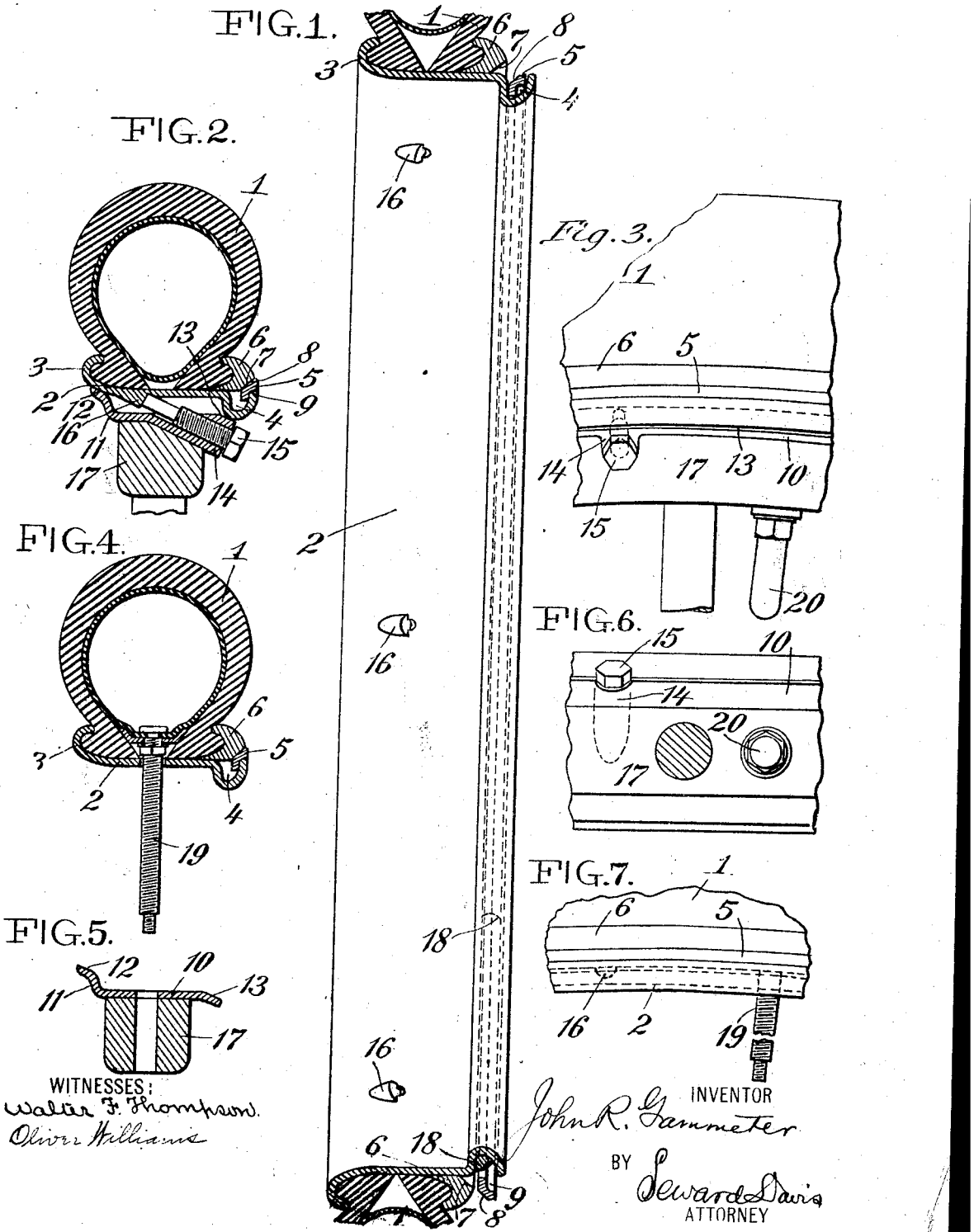

JOHN R. GAMMETER, OF AKRON, OHIO, ASSIGNOR, BY MESNE ASSIGNMENTS, TO THE B. F. GOODRICH COMPANY, A CORPORATION OF NEW YORK.

VEHICLE WHEEL-RIM.

1,088,656.

Specification of Letters Patent. Patented Feb. 24, 1914.

Application filed May 21, 1907. Serial No. 374,903.

*To all whom it may concern:*

Be it known that I, JOHN R. GAMMETER, a citizen of the United States, and a resident of the city of Akron, in the county of Summit, State of Ohio, have invented certain new and useful Improvements in Vehicle Wheel-Rims, of which the following is a specification, reference being had to the accompanying drawings, forming a part thereof.

My invention relates to vehicle wheel rims made in two parts, one part of which, carrying the tire, may be removed from the fixed part of the rim and the new tire put on or a similar part already provided with a tire substituted for the removed part.

My invention also contemplates means for providing this detachable part or rim with devices for readily engaging or disengaging the tire. I have shown in this case means for holding the tire of the general form shown and claimed broadly in my Patent No. 969,779, dated September 13, 1910, though it is obvious that any other means may be provided for retaining the tire in place.

It is of great advantage to be able to quickly detach the rim and tire from a wheel and substitute a new rim and tire, as the new tire may be carried ready inflated on the rim and the time usually necessary for inflating the tire can be saved. This is of especial advantage where time saving is an element of material value. It is also of advantage to provide means for quickly removing the tire from the detachable rim as in that case the tire can be removed and repaired and be reinflated ready to be put back on the wheel if another accident should happen.

More specifically this invention contemplates the use of an endless detachable rim provided with means for engaging a tire and adapted to seat on a fixed rim attached to the wheel felly. Means are carried by the fixed rim, in this case inclined screws, for holding the detachable rim upon its seat. It is to be understood however that the invention is not limited to the specific forms selected for purposes of illustration but that the different parts may be freely modified so long as their several functions are performed relatively to each other without altering the effective combination of elements.

In the drawings, Figure 1 is a cross section of a detachable rim constructed in accordance with my invention and showing the foot of a tire seated thereon. Fig. 2 is a cross section through the detachable rim, the tire, the fixed rim and the felly showing one of the inclined screws for retaining the detachable rim in place. Fig. 3 is a fragmentary side elevation of the tire, rim and felly shown in Fig. 2. Fig. 4 is a cross section of the detachable rim and the tire taken at the valve stem. Fig. 5 is a cross section of the felly and fixed rim showing the opening for the valve stem. Fig. 6 is a view of the under side of the felly, rim and tire shown in Fig. 3, one of the wheel spokes being shown in section. Fig. 7 is a side elevation of a portion of the detachable rim and tire showing the valve stem, one of the abutments for the retaining screws appearing in dotted lines.

Referring to the drawings by reference numerals, 1 is the tire which is in this case shown as a clencher tire though it is obvious that by properly modifying the form of the tire retaining flanges any other type of tire may be used.

2 is the detachable tire seating rim provided at one edge with a fixed tire retaining flange 3, the other edge in this case being provided with a groove 4, endless locking ring 5, and endless removable tire retaining flange 6 similar to the structure shown in my application above referred to. This tire retaining flange 6 is as shown of the proper size to fit upon the tire seating part of the rim 2. It is provided on its outer lower edge with an inclined face 7. The locking ring 5 is provided with an inclined face 8 to engage the inclined face 7 and with a cut out portion 9 to engage the upper edge of the outer wall of groove 4. The outer diameter of this locking ring 5 it will be seen, is greater than the inner diameter of the flange 6 so that the flange 6 cannot pass over the locking ring ordinarily. The inner diameter of the locking ring is less than the diameter of the outer edge of the wall of groove 4, so that the locking ring will ordinarily not pass over the said edge. However by dropping one part of the locking ring into the groove 4 and springing the ring slightly out of circular shape, it becomes easily removable. The flange 6 and also the tire can then be readily slipped off the detachable rim. It is also possible as an alternative mode of operation to merely drop the locking ring 5 into the groove 4 at the top and then slip the top part of the flange 6 over the ring in the groove and free from the outer wall of the groove and then drop the flange so that it will clear the lower projecting part of the locking ring when it can be entirely removed. The tire can then be slipped off in the same way.

I have shown in Fig. 1 a filling lug 18 fixed in the bottom of groove 4 in any suitable manner. This lug preferably has a length of about one third of the circumference of the rim and should be placed diametrically opposite or nearly so to the valve stem which is provided with the usual clip. The purpose of this lug is to prevent the locking ring 5 from accidentally slipping into the groove 4 in case the tire should become deflated while in use. Possible displacement of the other side of the ring is prevented by the clip. The operation is substantially as above described, the clip being first loosened and moved out of the way, when the ring can be dropped into the groove at that side of the wheel where there is no filler. This arrangement of locking ring and filler lug may be advantageously employed on a fixed rim such as illustrated in my case above referred to, or on a rim made detachable in any other manner.

For retaining the detachable rim in place a fixed rim 10 secured to the felly 17 in any suitable manner, is used, provided on one edge with an upwardly and outwardly bent flange 11 forming an inclined face 12 for supporting the edge of the detachable rim carrying the flange 3. The other edge of the fixed rim is provided with a downwardly bent flange 13 upon which the lower part of the wall of groove 4 seats. At desired intervals the fixed rim is provided with screw threaded sockets 14 inclined inwardly and upwardly. Screws 15 provided with heads of suitable form for engagement with a wrench or screw driver are screwed in these inclined sockets. The inner end of each screw is adapted to engage an abutment 16 formed on the inner surface of the detachable rim. These screws are inclined in the same general direction as the inclined faces of flanges 11 and 13 so that when they are turned up they tend to wedge the detachable rim upon the said inclines thus making a very firm and solid connection. This means of holding the detachable rim upon the fixed rim may obviously be used with a rim of any desired form, either one provided with fixed tire flanges or with any type of removable tire flange other than the one shown. To detach the detachable rim from the fixed rim it is merely necessary to withdraw the screws sufficiently to disengage the lugs or abutments 16 and permit them to slide off over the ends of the screws, when the detachable rim can be freely slipped off. Another rim is applied by merely slipping it in place against the inclined flanges of the fixed rim and screwing up the screws. The valve stem will of course be first inserted in its opening in an obvious manner.

Having thus described my invention, I claim:

1. In combination in a vehicle wheel, a fixed rim, a detachable rim, and inclined screws carried by said fixed rim and engaging abutments on said detachable rim for holding the latter in place.

2. In combination in a vehicle wheel, a rim provided with a tire seating portion, a groove at one edge of said tire seating portion, a detachable tire retaining flange adapted to engage said tire seating portion, said retaining flange being provided with an inclined lower outer surface, an endless locking ring adapted to fit in said groove having an inner diameter less than the diameter of the outer wall of said groove and an outer diameter greater than the inner diameter of said retaining flange and provided with an upper inner face of the same inclination as the inclined face on the tire retaining flange.

3. In combination in a vehicle wheel, a detachable tire seating rim provided at one edge with a fixed tire retaining flange and at the other edge with a downwardly, outwardly and upwardly bent portion forming a groove for retaining a locking ring, a fixed rim provided with an upwardly and outwardly inclined flange at one edge adapted to engage the detachable rim near its fixed tire retaining flange, and a downwardly inclined flange at the other edge adapted to engage the downwardly and outwardly bent portion of the detachable rim, screw threaded sockets in said fixed rim inclined from the side of the rim carrying the downwardly projecting flange, upwardly toward the side of the rim provided with an upwardly and outwardly projecting flange, a screw for each socket and abutments on the inner surface of the detachable rim for engagement with the screws.

4. In combination in a vehicle wheel, a fixed member, a detachable rim member, and headed screws screwing through threaded openings in one of said members, the points of said screws engaging abutments on the other of said members and acting to force said detachable rim member laterally.

5. In combination in a vehicle wheel, a fixed rim, a detachable rim, and inclined wedging screws carried by one of said rims engaging abutments on the other rim.

6. In combination in a vehicle wheel, a fixed member and a detachable rim member, and screws screwing into threaded openings in one of said members and engaging abutments on the other of said members and acting to force said detachable rim member laterally, said screws disengaging said abutments and permitting the removal of the detachable rim member when partially withdrawn.

7. In a vehicle wheel rim, the combination of a tire-seating member, a removable endless, tire-retaining flange, and an endless locking ring, said tire-seating member being formed with a groove along one edge, a filling lug fixed in said groove for a portion of its length, said locking ring being adapted to enter the portion of the groove not occupied by the filling lug.

8. In a vehicle wheel rim, the combination of a tire-seating member having a groove along one edge, a filling in said groove for a portion of its length, an endless tire-retaining flange, and an endless locking ring adapted to enter said groove and having an inner diameter less than the diameter of the edge of the outer wall of said groove.

JOHN R. GAMMETER.

Witnesses:
ARTHUR E. DAVISON,
WALTER K. MEANS.